United States Patent

Jakobi

[11] Patent Number: 5,928,080
[45] Date of Patent: Jul. 27, 1999

[54] DEVICE FOR CHOPPING THE STALKS AFTER THE EARS OF CORN HAVE BEEN CUT OFF IN A COMBINE HARVESTER

[75] Inventor: Wilhelm Jakobi, Saulgau, Germany

[73] Assignee: Biso B.V, Roosendaal, Netherlands

[21] Appl. No.: 08/849,012
[22] PCT Filed: Sep. 17, 1996
[86] PCT No.: PCT/EP96/04066
   § 371 Date: Aug. 7, 1997
   § 102(e) Date: Aug. 7, 1997
[87] PCT Pub. No.: WO97/11594
   PCT Pub. Date: Apr. 3, 1997

[30] Foreign Application Priority Data

Sep. 25, 1995 [DE] Germany ............... 195 35 175

[51] Int. Cl.⁶ .................................................. A01F 12/40
[52] U.S. Cl. ............................ 460/112; 460/113; 56/505
[58] Field of Search .................... 460/111, 112, 460/113, 116, 119, 901; 56/504, 505

[56] References Cited

U.S. PATENT DOCUMENTS

| | | | |
|---|---|---|---|
| 2,626,159 | 1/1953 | Thompson . | |
| 2,950,747 | 8/1960 | Alloway . | |
| 3,005,637 | 10/1961 | Hetteen | 460/112 X |
| 3,350,017 | 10/1967 | Howell et al. . | |
| 4,631,910 | 12/1986 | Doyen et al. | 56/505 |

FOREIGN PATENT DOCUMENTS

| | | | |
|---|---|---|---|
| 558601 | 7/1957 | Belgium . | |
| 0166116 | 1/1986 | European Pat. Off. . | |
| 0 415 419 | 3/1991 | European Pat. Off. | 460/112 |
| 0479329 | 4/1992 | European Pat. Off. . | |
| 0538599 | 4/1993 | European Pat. Off. . | |
| 2479648 | 10/1981 | France . | |
| 2569520 | 7/1986 | France . | |
| 2805208 | 8/1979 | Germany . | |

Primary Examiner—Terry Lee Melius
Attorney, Agent, or Firm—Dilworth & Barrese

[57] ABSTRACT

The object of the invention is a straw-cutting machine which is positioned behind the grain separation devices of a combine harvester and whose separation organs chop the stalks falling from the straw walkers into short pieces. The aim of the invention is by means of a special design of the separation organs to reduce the required driving power, to chop and disintegrate stalks falling onto the straw-cutting machine in a lateral position or a longitudinal direction uniformly into the smallest possible pieces and subsequently to disperse the chopped stalks as uniformly as possible over the whole cutting width on the soil. This is achieved by positioning in uniform distribution fixed tang plates serrated on their front sides on the mantle of a chopping cylinder which tang plates separate laterally positioned stalks in a drawing cut in a uniform, relatively thin veil over cutting knives fixed rigidly, but equipped with springs on the chopping floor. The stalks taken up in a longitudinal direction by the tang plates are separated separately in a following device. In this process, this device can comprise a simple counter bar positioned directly after the chopping knives. For stalks which are more difficult to separate, optionally a cylinder-type chopper or several flywheel choppers can also be located after the lateral cutting device.

18 Claims, 8 Drawing Sheets

DEVICE FOR CHOPPING THE STALKS AFTER THE EARS OF CORN HAVE BEEN CUT OFF IN A COMBINE HARVESTER

BACKGROUND OF THE INVENTION

The object of the invention is a straw-cutting machine which is positioned behind the grain separation devices of a combine harvester and whose separating organs chop the stalks falling from the straw walkers into short pieces which are discharged through a distribution box and deposited on the floor spread over the cutting width.

Straw-cutting machines of a conventional design generally have cutter knives supported in a freely movable manner on a cylinder tube which cutter knives take up the falling stalks and beat against fixed position opposite cutting knives. In this process, the stalks are cut up while consuming high power.

Furthermore, this type of construction has the disadvantage that stalks passing roughly in a longitudinal direction over the straw walkers are only separated insufficiently. This is bad in that due to new cultures the straw is becoming ever shorter and ever more stable and thus passes over the straw walkers in a longitudinal direction in a larger quantity.

But longer straw in a large quantity is only insufficiently distributed behind the distributor hood, it can only be poorly worked into the soil and it rots badly.

SUMMARY OF THE INVENTION

The object of the invention is to reduce the power requirements of the straw-cutting machine over known versions, to cut and disintegrate the straw shook out in uniform short pieces irrespective of whether it falls from the straw walker in a lateral position or longitudinal direction and to distribute it uniformly on the soil over the whole cutting width with a powerful air flow.

In the process, the foreign bodies carried with the stalks should pass through the straw-cutting machine without damaging or destroying it.

This is achieved in accordance with the invention by having instead of the conventional chopping knives supported in a freely movable manner on a cylinder tube, tangs fixed rigidly on a cylinder roll and provided on their front sides with an aggressive, eccentrically relieved serration which tangs take up the stalks to be separated and pull them in a relatively thin stalk veil in a drawing cut over chopping knives with a sharp cutting edge fixed on the chopping floor whereby the stalks are separated with a relatively low energy consumption.

The width of the tangs corresponds here approximately to the width to which the laterally positioned stalks should be cut.

The tangs are positioned uniformly distributed in any number of rows in a spiral shape on the circumference of a cylinder roll with the first tang of a row in each case lying in a longitudinal direction of the cylinder roll at the same height as the last tang of a row on the opposite side.

By means of this design, the stalks pass through the straw-cutting machine in a relatively thin veil with practically only two tangs in each case frictionally contacting the stalks to be separated being separated by the chopping knives.

In this way, a constant, relatively low torque results and correspondingly a low constant power requirement.

In this process, tang on tang can lie in a row with a gap between each through which the fixed position chopping knife can pass. But one tang each can also be omitted from a row so that the number of cuts and thus the power requirement is reduced.

One special advantage of the wide tangs is also that they first generate a powerful wind around the cylinder mantle and then securely discharge the chopped stalks through the spade-shaped design.

The fixed position chopping knives are fixed in pairs on rotating knife-bearers supported on a knife floor positioned outside and roughly parallel to the cutting floor. Here, the knife-bearers are provided with stops which are pressed against the knife floor by means of springs. The chopping knives themselves protrude into the chopping box through slits in the knife floor and the cutting floor. If a hard foreign body is taken up by the tangs, the chopping knives yield to the outside so that the foreign body can pass the cutting device without damaging it. The knife floor can be retracted so far as one unit with the knife-bearers and the chopping knives that the chopping knives are outside the cutting area. If the distribution box is swivelled out at the same time, it is possible to deposit the stalks over the chopping cylinder in an uncut manner in a swathe. In this process, the stalks are bent and disintegrated and are so better suited for further utilization. Thanks to the previously described lateral cutting device, stalks primarily passing laterally through the straw-cutting machine are separated.

A further feature of the invention is that optionally different cutting devices are positioned after the lateral cutting device by means of which stalks passing through the straw-cutting machine in a longitudinal direction are separated into short pieces. In the simplest version, pivotable opposite cutting plates are positioned under the chopping knives on the cutting floor which opposite cutting plates have eccentrically relieved serrations on their front sides, the serrations of the opposite cutting plates agreeing in profile to the serrations of the tang plates and protruding into these up to a distance parallel on all sides of less than 3 mm.

In this way, straw passing through the straw-cutting machine lengthways is separated and thus cut into pieces along its length at that point at which a tang plate passes an opposite cutting plate.

These counter-bars are distributed in width in segments over the chopping cylinder with each segment being held in engagement with the tangs by a single spring. If a hard foreign body passes through the straw-cutting machine, these segments yield backwards in accordance with their width.

So that the chopped stalks discharged from the distribution box are distributed securely over the whole cutting width, radial blowers are located at both ends of the cylinder roll and fixed securely to it, which radial blowers suck in air from the side of the straw-cutting machine housing and blow it into the distribution box. For stalks which are more difficult to chop and if a high quantity of longitudinally positioned stalks is to be cut, as is shown in FIG. 9 and FIG. 10, instead of the opposite cutting plates optionally a simple cylinder-type chopper or several flywheel choppers is/are positioned behind the lateral cutting device to shorten the stalks passing longitudinally through the straw-cutting machine.

The cylinder-type chopper corresponds in design and operation to the conventional construction with chopping bars passing laterally over the cylinder width. In a special design, the beater bars run in a screw shape laterally from one side to the other with the angle of clasping being greater than 360 degrees. In this way, the cutting bars practically always maintain engagement. The height of the cutting bars corresponds here roughly to the length to which the stalks are to be shortened. To support the discharge, a radial blower is assigned to the cylinder-type chopper as described above.

If flywheel choppers are positioned after the lateral cutting device, at least two of these are provided so that the chopped stalks can be distributed uniformly to both sides through the distribution hood. The height of the chopping bars corresponds here too roughly to the length to which the stalks are to be shortened. The drive of the flywheel chopper is performed in a manner not described in detail with belt drives or bevel gears.

BRIEF DESCRIPTION OF THE DRAWINGS

The embodiment in accordance with the invention is disclosed in FIGS. 1 to 10 with the accompanying descriptions.

DESCRIPTION OF THE PREFERRED EMBODIMENTS

Figure 1:
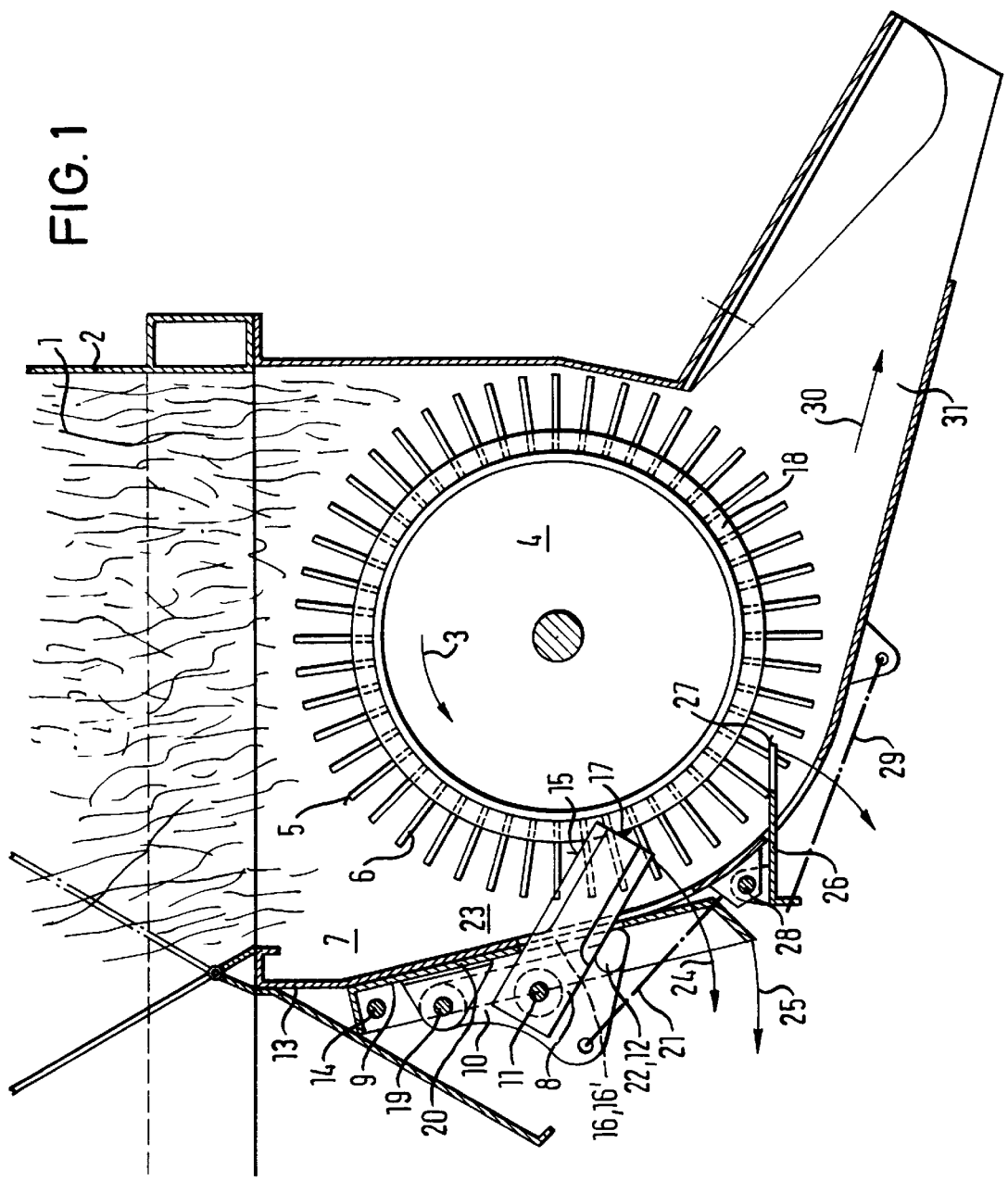
FIG. 1 shows a longitudinal section through a straw-cutting machine with a stalk lateral cutting device and a following separation device by means of counter cutting plates for stalks passing through the straw-cutting machine lengthways.

FIG. 1 shows a cross-section through a straw-cutting machine where the stalk lateral cutting device is associated with a stalk longitudinal cutting device positioned below it.

Here, the stalks (1) to be chopped fall from a straw outlet hood (2) onto the chopping drum (4) rotating in the direction of the arrow (3). Here, the stalks are picked up by tangs (6) with eccentrically relieved serrations on their front sides (5) and transported to the inlet area (7). The tang plates draw the stalks from here over cutting knives (8) fixed rigidly in pairs to the outside of a knife floor (9) on bearers (10) by means of screws (11) and limited downwardly by stops (12). The knife plate or floor (9) runs roughly parallel to the chopping floor (13).

The knife floor (9) is pivoted in bearings (14) on the chopping floor (13). The cutting knives protrude with their front ends, which possess sharp cutting edges (15), through slits in the knife floor (9) and the chopping floor (13) between two tang plates (6) in each case with their front ends (17) up to the outer diameter of the cylinder roll (18).

The bearers (10) are supported on bolts (19) which are, in turn, supported in bearing plates (20). In this process, the bearers are drawn down to a stop (22) by a stroke (21) with that part of the cutting knives protruding between the tang plates into the chopping area (23) being pressed upwards. If a hard foreign body not shown in any detail enters the inlet room (7) and is taken up by the tang plates there, the cutting knives yield backwards in the direction of the arrow (24). Independently of this, the knife floor (9) can yield with all cutting knives in the direction of the arrow (25) around the swivel point (14).

Below the cutting knives, opposite cutting plates (26) are positioned on the chopping floor (13) which opposite cutting plates (26) have eccentrically relieved serrations on their front sides (27), the serrations agreeing in profile with the serrations on the front sides of the tang plate and both serrations agreeing up to a distance parallel on all sides of less than 3 mm. The opposite cutting plates are pivoted on bolts (28) and are pressed by means of a stroke (29) against an adjustable stop not described in any detail. The opposite cutting plates are divided into several segments of which each can yield singly and alone when a hard foreign body strikes. The counter bar (26) may be divided over the width of the chopping cylinder (4) into segments, with each single segment being able to be pivoted in a bearing. The counter-bar segments are drawn by strokes into the chopping area independently of one another and limited by the stop.

The stalks chopped in a lateral direction and a longitudinal direction is then discharged to the rear from the distribution hood (31) in the direction of the arrow (30).

The lateral chopping device is designed in such a manner that the tang plates (6) are located on the mantel of the chopping cylinder (4) in several rows laterally over the width of the chopping cylinder (4), with a width of at least 25 mm, serrations on their front sides (5) and an intermediate space of at least 6 mm. Around the circumference of the tips (5) of the tang plates (6), the arc-shaped chopping floor (13) is positioned on one side, with the chopping knifes (8) being fixed on an outer side thereof and reaching inwardly between the tang plates (6) through slits in the chopping floor (13) up to around 5 mm to the mantle of the chopping cylinder (4). The serrated (5) tang plates (6) are screwed on in a removable manner. The chopping knives (8) are positioned to extend through an angle of more than 10° to the horizontal from outside to inside and downwardly.

Figure 2:
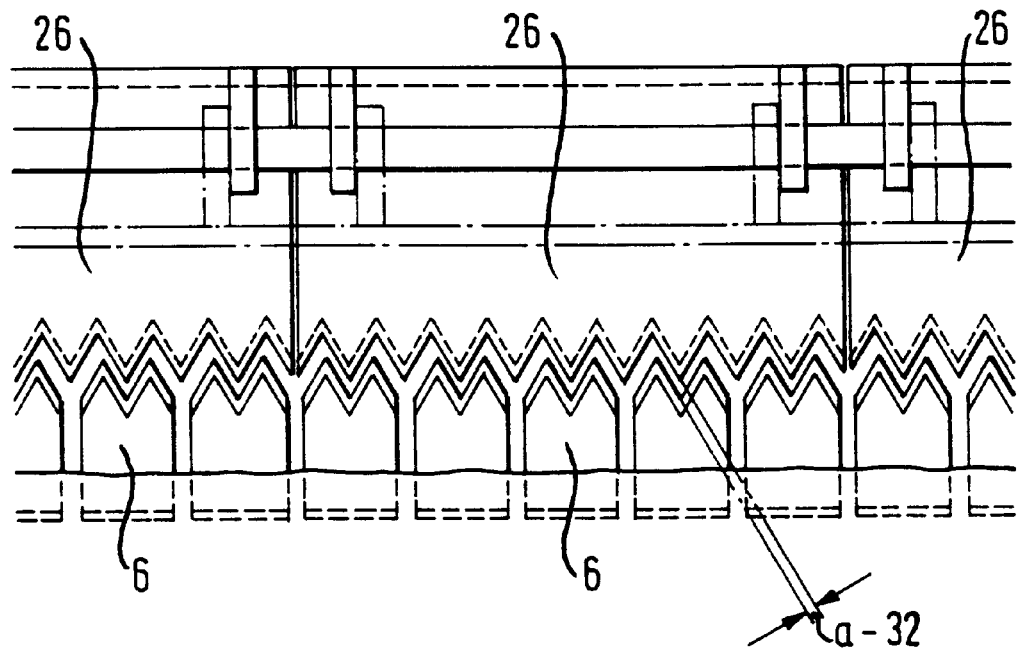
FIG. 2 illustrates a top view of the separation device of FIG. 1.

FIG. 2 shows a view of the opposite cutting plates (26) in engagement with the tang plates (6). Here, the segment-like division of the opposite cutting plates and the profile agreement of tang plate and opposite cutting plate can be seen. Here, the front sides (5), (27) of the opposite cutting plate and the tang plate engage in a serrated manner parallel to each other at a distance a (32) of less than 3 mm.

Figure 3:
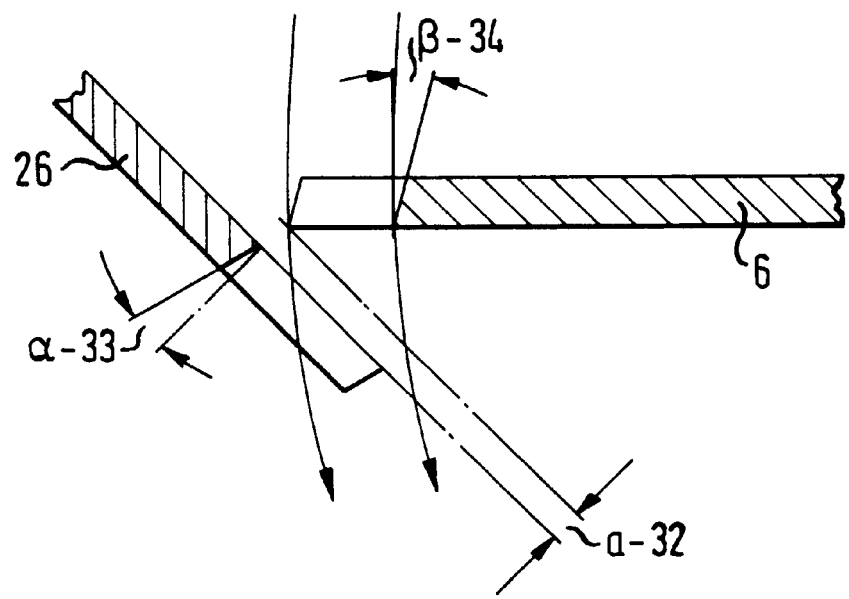
FIG. 3 illustrates how the cutting plates and the counter-bars are eccentrically relieved.

FIG. 3 shows the undercut angles a (33) and β (34) of tang plates and opposite cutting plates. The undercut angles here are greater than 3 degrees. Both angles can be of equal or different size as required.

Figure 4:
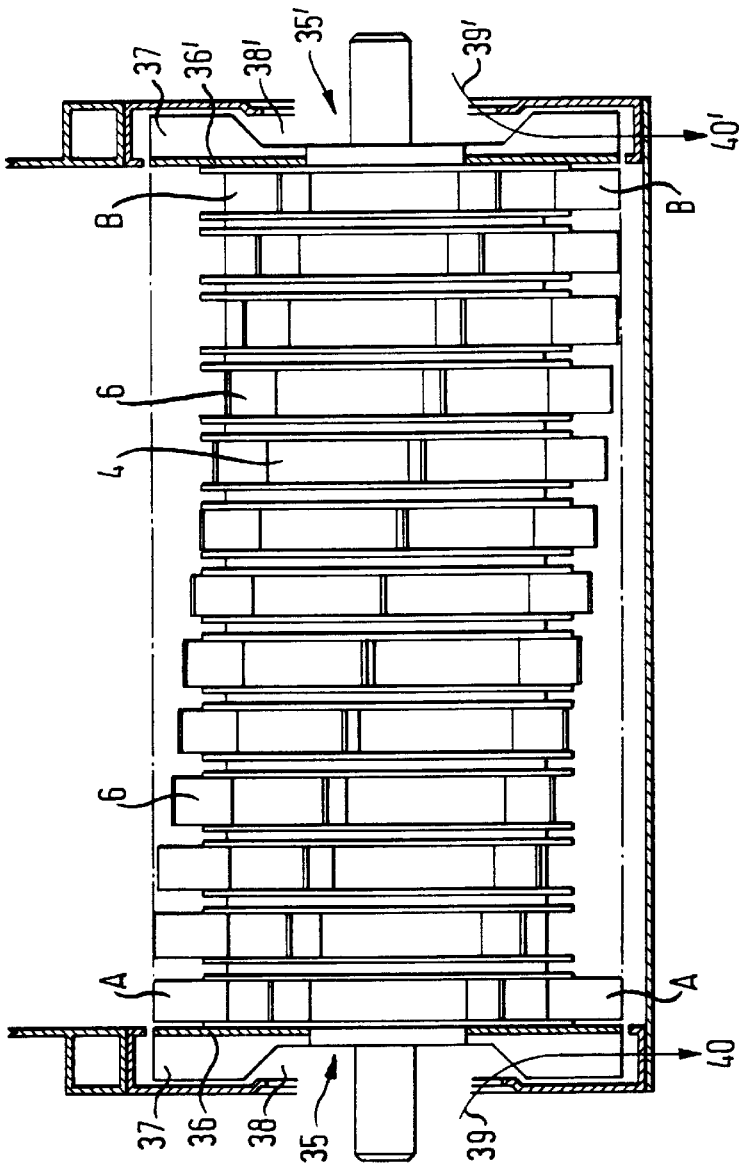
FIG. 4 illustrates a longitudinal section through the chopping cylinder which reveals the arrangement of the tang plates and the axial blowers.

FIG. 4 shows a longitudinal section through the chopping cylinder (4) revealing the arrangement of the tang plates (6). On both ends of the chopping cylinder (4) one axial blower each (35), (35') is positioned. Here, any number of ventilator blades (37) are positioned on plates (36), (36') connected to the front sides of the cylinder mantle. The air (39) sucked in through an aperture (38), (38') is blown into the distribution hood (31) in the direction of the arrow (40), (40').

Figure 5:
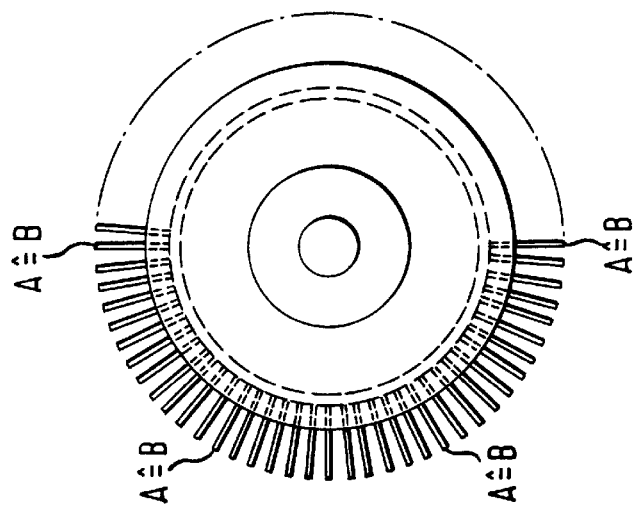
FIG. 5 illustrates a cross-section through the chopping cylinder revealing the positions of the tang plates to one another.

FIG. 5 shows the arrangement of the tang plate rows (6) in their screw-shaped passage over the cylinder mantle. Here, it is shown that each first tang plate (6) marked by an "A" of a row on the circumference has the same angle position as the last tang plate marked by a "B" of the following or preceding row.

Figure 6:
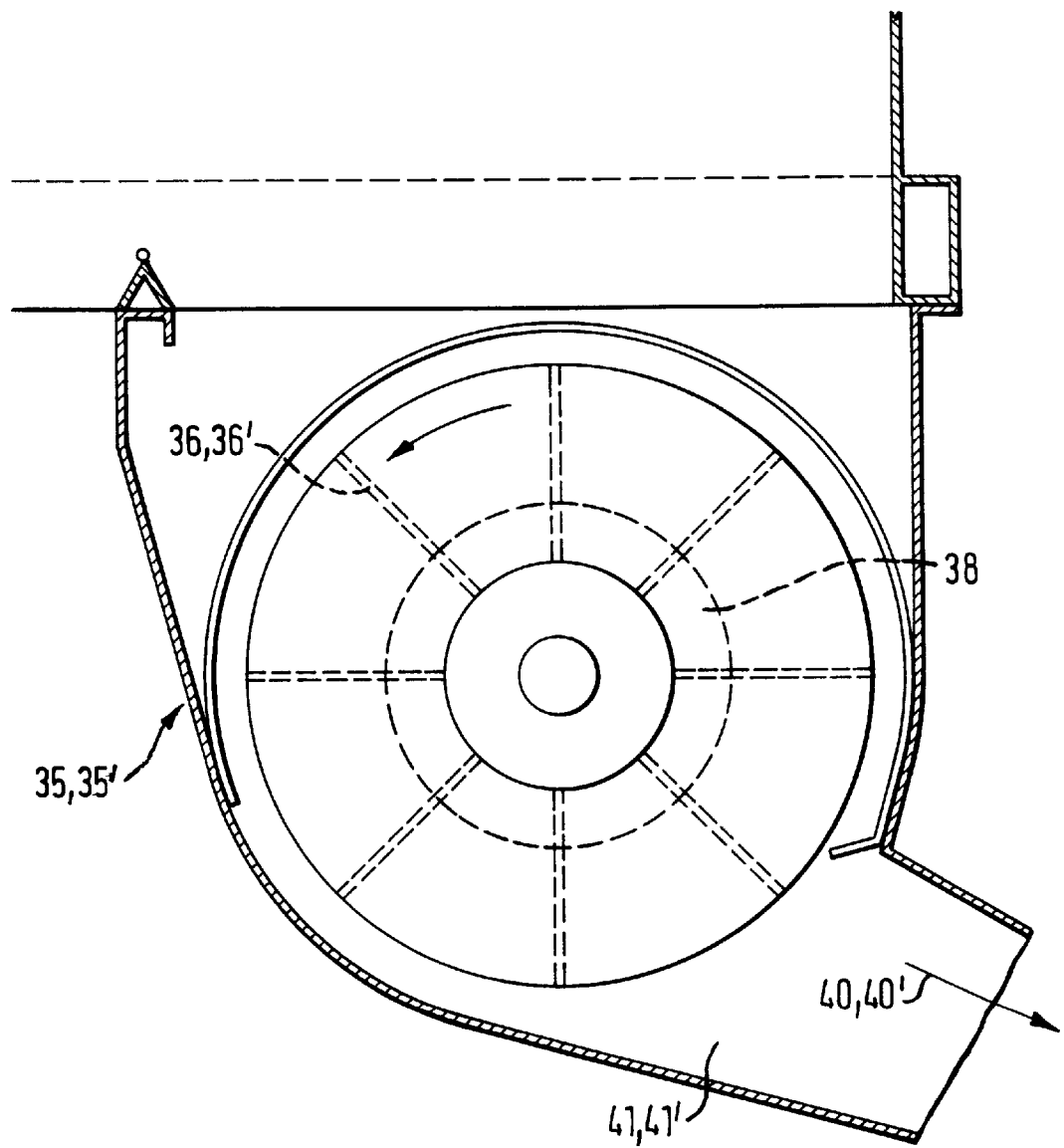
FIG. 6 illustrates a cross-section through an axial blower.

FIG. 6 shows a cross-section through an axial blower (35, 35'). Here, the air sucked in through an aperture (38) in the center of the blower through the ventilator blades (36), (36') from outside the chopping box is emitted through a discharge (41), (41') into the distribution box in the direction of the arrow (40), (40').

Figure 7:
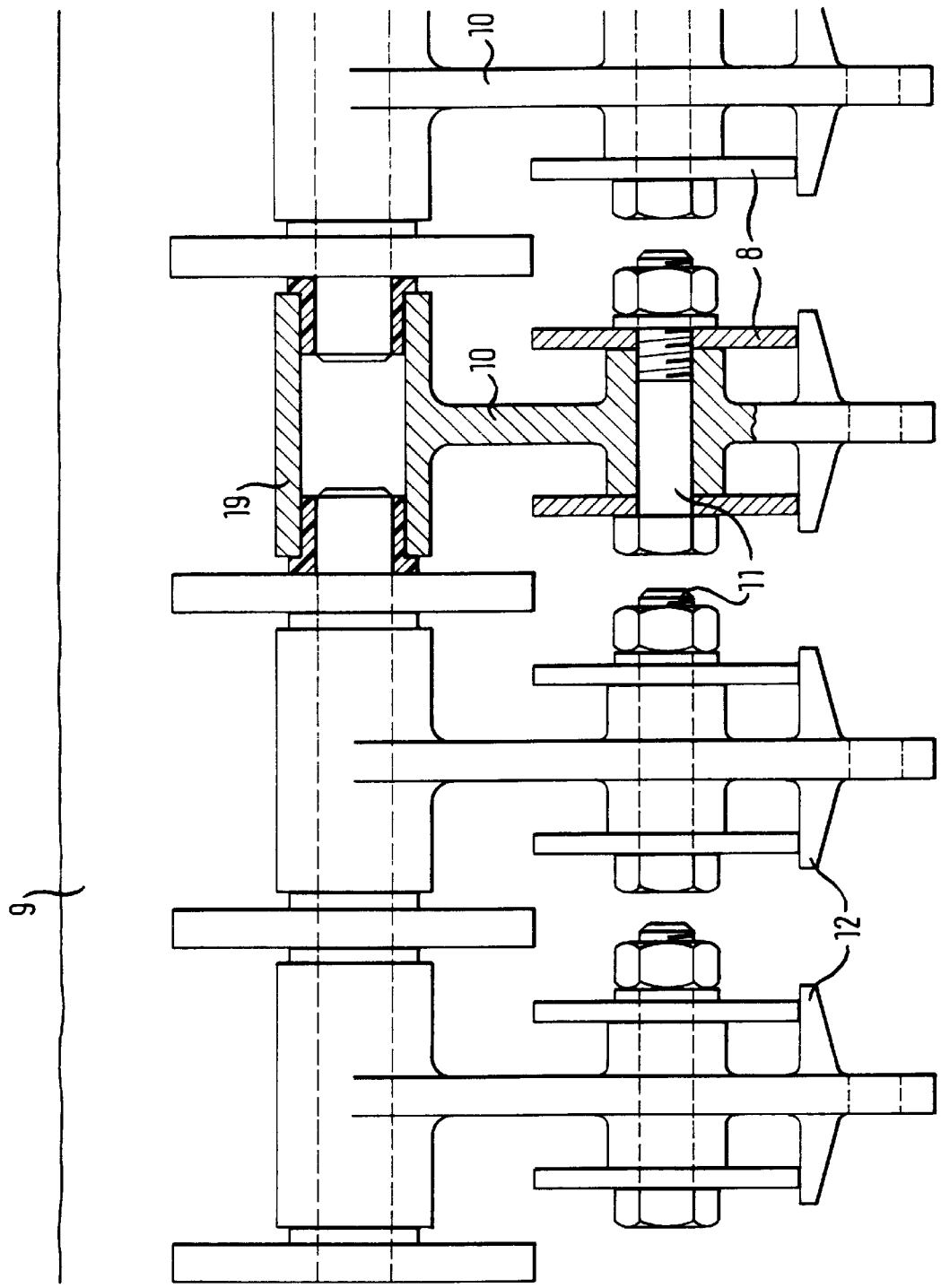
FIG. 7 illustrates a view of the knife-bearers.

FIG. 7 shows a view with an exemplary embodiment of the stalk lateral cutting device from the outside onto the knife floor (9) at a larger scale. Here are shown, for example, the bearers (10) on which the cutting knives (8) are rigidly fixed by screws (11). Here, the cutting knives are limited downwardly by stops (12). The bearers (10) are, in turn, supported on bolts (19).

Figure 8:
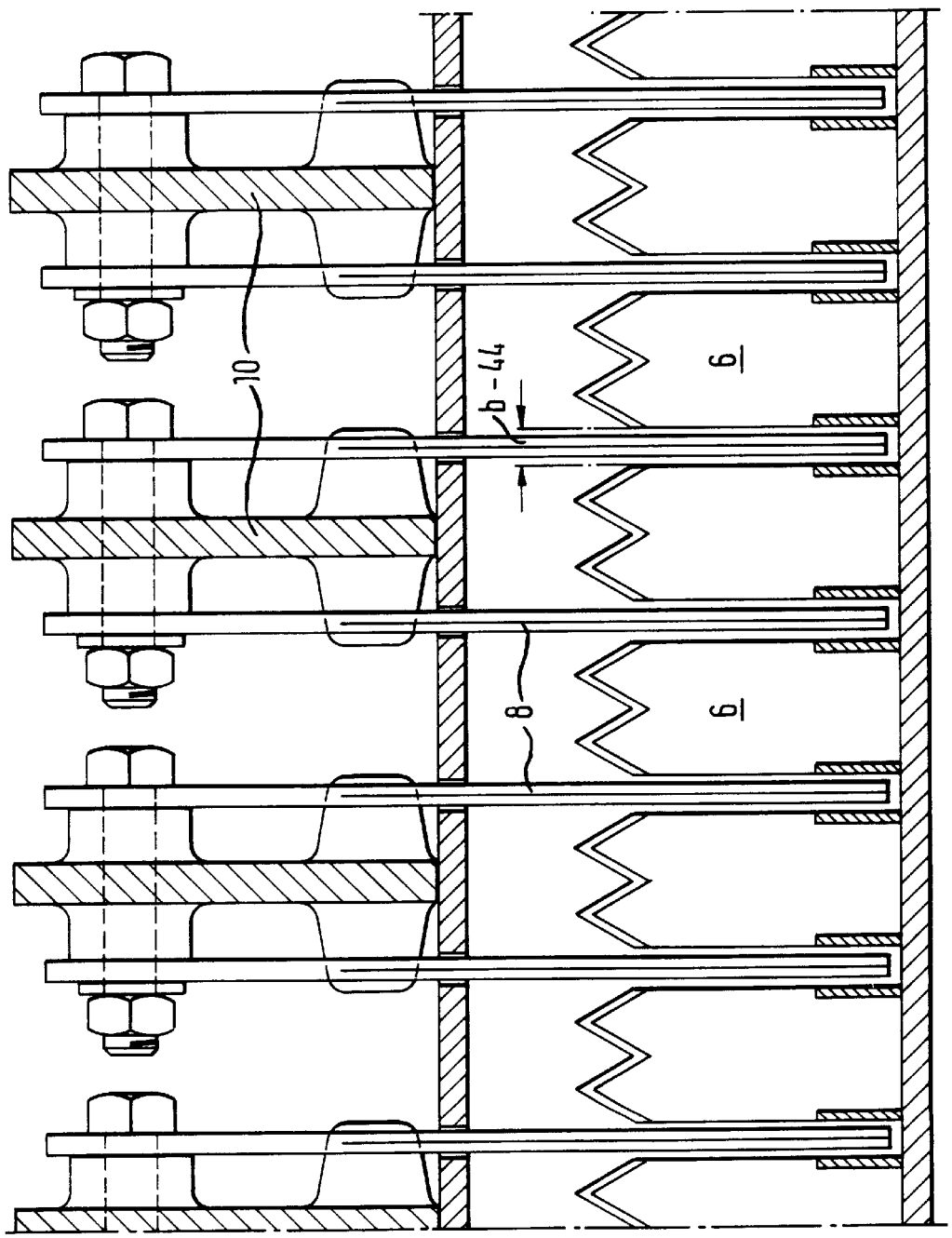
FIG. 8 illustrates a view of the tang plates.

FIG. 8 shows a top view of any segment of the stalk lateral cutting device with the interaction of tang plates (6) and cutting knives (8) being shown at an exploded scale. Here it can be seen how the chopping knives are positioned in the gap b (44) between tang plates lying next to each other in each case.

Figure 9:
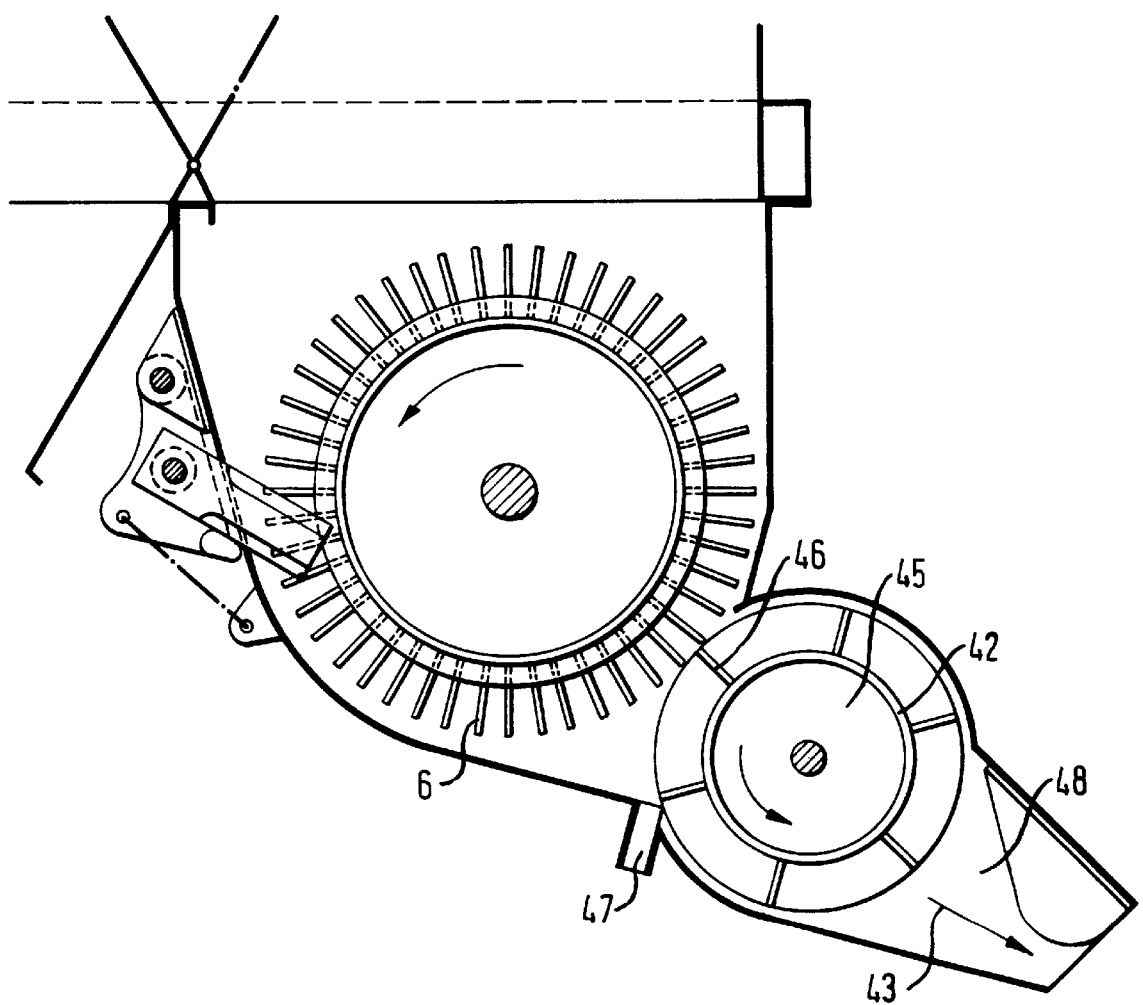
FIG. 9 illustrates a longitudinal section through a straw-cutting machine with a stalk lateral cutting device and a following separation device by means of cylinder-type choppers for stalks passing through lengthways.

FIG. 9 shows how a cylinder-type chopper (45) is positioned after the stalk lateral cutting device. Here, the stalk parts taken up by the tang plates and aligned lengthways are picked up by the chopping bars (46) and shortened in interaction with a counter-cutter (47). The chopping bars are here positioned on a cylinder mantle (42) laterally over the width of the straw-cutting machine in a spiral shape with one cylinder bar clasping spirally the cylinder mantle from one side to the other at an angle equal to or larger than 360 degrees. The chopped stalks are then discharged through a distribution box (48) in the direction of the arrow (43).

Figure 10:
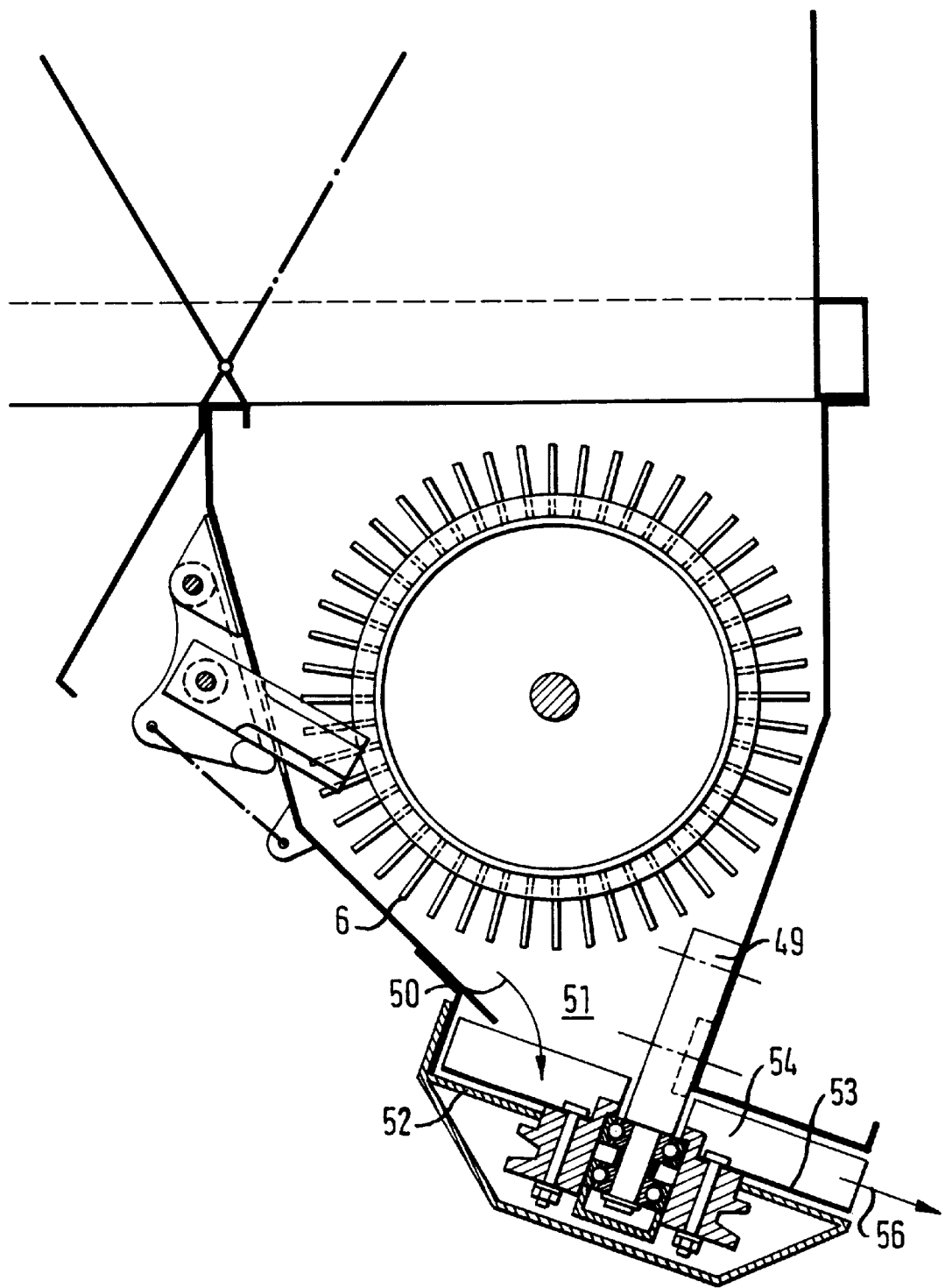
FIG. 10 illustrates a longitudinal section through a straw-cutting machine with a stalk lateral cutting device and a following separation device by means of flywheel choppers for stalks passing through lengthways.

FIG. 10 shows the assignment of flywheel choppers (49) behind the lateral cutting devices. Here, the stalks chopped in a lateral position are passed on by the tang bars (6) in the direction of the arrow (50) through apertures (51) to the chopper housings (52) of several flywheel choppers positioned next to each other together with the longitudinally aligned, unchopped stalks. The chopping knives (54) fixed on a driven chopping wheel (53) take up the longitudinally aligned stalk parts and shorten these in an interaction with a counter-cutter (55). The chopped stalks are then discharged in the direction of the arrow (56). The flywheel choppers (49) can be swiveled out downwardly or upwardly either individually or together.

I claim:

1. A straw-cutting machine for the chopping of stalks behind a grain separation device of a combine harvester comprising the combination of:
    a chopping cylinder with tangs of any shape on a cylinder mantle,
    which cylinder is supported in a chopping housing with a chopping floor on which fixed position opposite knives are located to form (i) a lateral chopping device by the interaction of the tangs with the opposite knives,
    which lateral chopping device is positioned for the separation of stalks lying laterally in the straw-cutting machine, with the chopped stalks being discharged through a distribution hood,
    and (ii) a special chopper positioned in the distribution hood downstream of the lateral chopping device in the straw-cutting machine, for the separation of stalks which pass through the lateral chopping device in a longitudinal direction.

2. A straw-cutting machine according to claim 1, wherein the lateral chopping device is designed in such a way that the tang plates are located on the mantle of the chopping cylinder in several rows laterally over the width of the chopping cylinder with a width of at least 25 mm, with serrations on their front sides and with an intermediate space distance of at least 6 mm and that around the circumference of the tips of the tang plates, the chopping floor which is arc-shaped is positioned on one side and on whose outside the chopping knives are fixed which reach inwardly between the tang plates through slits in the chopping floor up to around 5 mm to the mantle of the chopping cylinder.

3. A straw-cutting machine according to claim 1, wherein the serrated tang plates are screwed on in a removable manner.

4. A straw-cutting machine according to claim 1, wherein the chopping knives are fixed on a knife plate running roughly parallel to the chopping floor, with the knife plate being hung pivotably in bearings on the chopping floor and having slits through which the chopping knives protrude through the chopping floor into the chopper.

5. A straw-cutting machine according to claim 2, wherein the chopping knives are fixed on the knife plate on knife bearers which are pivotable in the bearings.

6. A straw-cutting machine according to claim 3, wherein the chopping knives are fixed in pairs on a knife bearer (10).

7. A straw-cutting machine according to claim 2, wherein the chopping knives are positioned running through an angle of more than 10 degrees to the horizontal from the outside to the inside and downwards.

8. A straw-cutting machine according to claim 6, wherein the knife bearers are drawn against a stop against the knife floor by a stroke.

9. A straw-cutting machine according to claim 3, wherein below the cutter knives on the chopping floor (13) counter bars serrated on their front sides are positioned which reach in the chopping area with their serrations into the serrations of the tangs with both serrations agreeing in profile in such a way that a parallel distance on all sides of less than 3 mm exists.

10. A straw-cutting machine according to claim 7, wherein the counter bar is divided over the width of the chopping cylinder into segments with each single segment being able to be pivoted in a bearing.

11. A straw-cutting machine according to claim 10, wherein the counter-bar segments are drawn by strokes into the chopping area independently of one another and limited by a stop.

12. A straw-cutting machine according to claim 1, wherein on both ends of the chopping cylinder axial blowers linked to it are positioned.

13. A straw-cutting machine according to claim 10, wherein the two axial blowers suck in air from outside and blow it into the distribution hood.

14. A straw-cutting machine according to claim 1, said special chopper is constituted by, a cylinder-type chopper located between the lateral cutting device and the distribution hood with chopping bars positioned on said cylinder mantle.

15. A straw-cutting machine according to claim 14, wherein the chopping bars are located on the cylinder mantle in a screw-shaped clasping manner with the clasp being at least 360 degrees from the start of the chopping bar on one side up to the end on the opposite side.

16. A straw-cutting machine according to claim 1, wherein between the lateral cutting device and the distribution hood, at least two flywheel choppers are positioned which constitutes said special chopper.

17. A straw-cutting machine according to claim 16, wherein the flywheel choppers can be swivelled out singly or severally downwards or upwards.

18. A straw-cutting machine according to claim 14, wherein the chopper bars interact with a counter cutter mounted on the distribution hood.

* * * * *